United States Patent
Maier et al.

(10) Patent No.: US 9,878,946 B2
(45) Date of Patent: Jan. 30, 2018

(54) METHOD FOR PRODUCING A HYDRAULIC BINDING AGENT

(71) Applicant: THYSSENKRUPP INDUSTRIAL SOLUTIONS AG, Essen (DE)

(72) Inventors: Oliver Maier, Münster (DE); Viktor Marchuk, Düsseldorf (DE); Michael Wilczek, Warendorf (DE); Dirk Schefer, Ennigerloh (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 296 days.

(21) Appl. No.: 14/441,776

(22) PCT Filed: Nov. 6, 2013

(86) PCT No.: PCT/EP2013/073159
§ 371 (c)(1),
(2) Date: May 8, 2015

(87) PCT Pub. No.: WO2014/072337
PCT Pub. Date: May 15, 2014

(65) Prior Publication Data
US 2015/0307398 A1    Oct. 29, 2015

(30) Foreign Application Priority Data
Nov. 9, 2012 (DE) .................. 10 2012 110 743

(51) Int. Cl.
| | |
|---|---|
| C04B 22/00 | (2006.01) |
| C04B 18/08 | (2006.01) |
| C04B 20/02 | (2006.01) |
| C04B 14/18 | (2006.01) |
| C04B 18/14 | (2006.01) |
| C04B 20/04 | (2006.01) |
| C04B 14/06 | (2006.01) |

(Continued)

(52) U.S. Cl.
CPC .............. *C04B 22/00* (2013.01); *C04B 14/06* (2013.01); *C04B 14/18* (2013.01); *C04B 18/08* (2013.01);
(Continued)

(58) Field of Classification Search
CPC combination set(s) only.
See application file for complete search history.

(56) References Cited

U.S. PATENT DOCUMENTS
| | | | |
|---|---|---|---|
| 3,501,323 A | 3/1970 | Moorehead | |
| 6,037,019 A | 3/2000 | Kooyer | |
| 2015/0203403 A1* | 7/2015 | Enders | ................ C04B 22/0086 106/819 |

FOREIGN PATENT DOCUMENTS
| | | |
|---|---|---|
| DE | 19548645 A1 | 6/1997 |
| EP | 2243754 A1 | 10/2010 |

(Continued)

OTHER PUBLICATIONS
English translation of Abstract of German patent No. DE 19548645 A1.
(Continued)

*Primary Examiner* — Erma C Cameron
(74) *Attorney, Agent, or Firm* — thyssenkrupp North America, Inc.

(57) ABSTRACT

Disclosed is a method and system for producing a hydraulic binder by processing of a silicate-containing component with at least one of calcium silicate hydrate- or belite-containing components. The method includes comminuting the silicate-containing component to a particle sizes of <100 µm, with at least partial breaking of Si—O—Si bonds and/or hydrogen bonds in the structure of the surface layer of the silicate-containing component, for surface activation. The method further includes contacting the comminuted silicate-containing component with calcium silicate hydrate- and/or belite-containing components to cause the calcium silicate hydrate- and/or belite-containing components to accumulate on at least 50% of the surface area of the silicate-containing carrier substance.

14 Claims, 2 Drawing Sheets

(51) Int. Cl.
   *C04B 20/10* (2006.01)
   *C04B 28/02* (2006.01)
   *C04B 22/06* (2006.01)
   *C04B 103/00* (2006.01)

(52) U.S. Cl.
   CPC .......... *C04B 18/146* (2013.01); *C04B 20/026* (2013.01); *C04B 20/04* (2013.01); *C04B 20/1055* (2013.01); *C04B 20/1077* (2013.01); *C04B 22/064* (2013.01); *C04B 28/02* (2013.01); *C04B 2103/0088* (2013.01); *Y02W 30/92* (2015.05); *Y02W 30/94* (2015.05)

(56) References Cited

FOREIGN PATENT DOCUMENTS

| | | |
|---|---|---|
| JP | H08 325077 A | 12/1996 |
| JP | H11 29349 A | 2/1999 |
| JP | 2011 153057 A | 8/2011 |

OTHER PUBLICATIONS

German Language International Search Report for International patent application No. PCT/EP2013/073159; dated Feb. 25, 2014.
English translation of International Search Report for International patent application No. PCT/EP2013/073159; dated Feb. 25, 2014.
Kumar S. et al: "Mechanical Activation of granulated blast furnace slag and its effect on the properties and structure of portland slag cement", Cement and Concrete Composites, Elsevier Applied Science, Barking, GB, vol. 30, No. 8, Sep. 1, 2008 (Sep. 1, 2008), pp. 679-685, XP023315927, ISSN: 0958-9465. DOI: 10.1016/J.CEMCONCOMP.2008.05.005 [retrieved on May 28, 2008].
English translation of abstract for JPH08325077 (A).
English translation of abstract for JPH1129349 (A).
English translation of abstract for EP2243754 (A1).
English translation of abstract for JP2011153057 (A).

* cited by examiner

METHOD FOR PRODUCING A HYDRAULIC BINDING AGENT

CROSS REFERENCE TO RELATED APPLICATIONS

This application is a U.S. National Stage Entry of International Patent Application Serial Number PCT/EP2013/073159, filed Nov. 6, 2013, which claims priority to German patent application no. DE 102012110743.2 filed Nov. 9, 2012, the entire contents of both of which are incorporated herein by reference.

FIELD

The invention relates to a method for producing a hydraulic binder and also to a method for producing a binder mixture, by processing of a silicate-containing component with calcium silicate hydrate-containing and/or belite-containing components.

BACKGROUND

In the production of cement clinker, lime-containing raw meal is first preheated, then calcined, and finally fired to completion. Massive amounts of $CO_2$ are released during the calcining of the limestone. A concern is therefore to reduce the $CO_2$ emissions.

EP 2 243 754 A1 describes a method for producing a hydraulic binder which is based on a calcium silicate compound and has properties similar to those of conventional Portland cement, but where much less $CO_2$ is released in its production. In that method, first of all, a calcium- and silicon-containing starting material is treated hydrothermally at temperatures of 120-250° C., producing a calcium silicate hydrate-containing intermediate. The intermediate is subsequently subjected to reactive milling at a temperature of 100-150° C., alone or together with another silicate-containing material, in a mill, with at least partial formation of a belite-containing binder, accompanied by reaction and dewatering, this binder being highly reactive and representing a binder comparable to Portland cement, with a low heat of reaction and a high filling strength.

SUMMARY

It is now an objective of the present invention to specify a method for producing a hydraulic binder, a method for producing a binder mixture, and the use of an installation for the two production methods, where the fraction of the calcium silicate hydrate- and/or belite-containing component in the binder can be reduced.

BRIEF DESCRIPTION OF THE DRAWINGS

The present disclosure is described in detail below with reference to the attached drawing figures, wherein.

DETAILED DESCRIPTION

Figure 1:
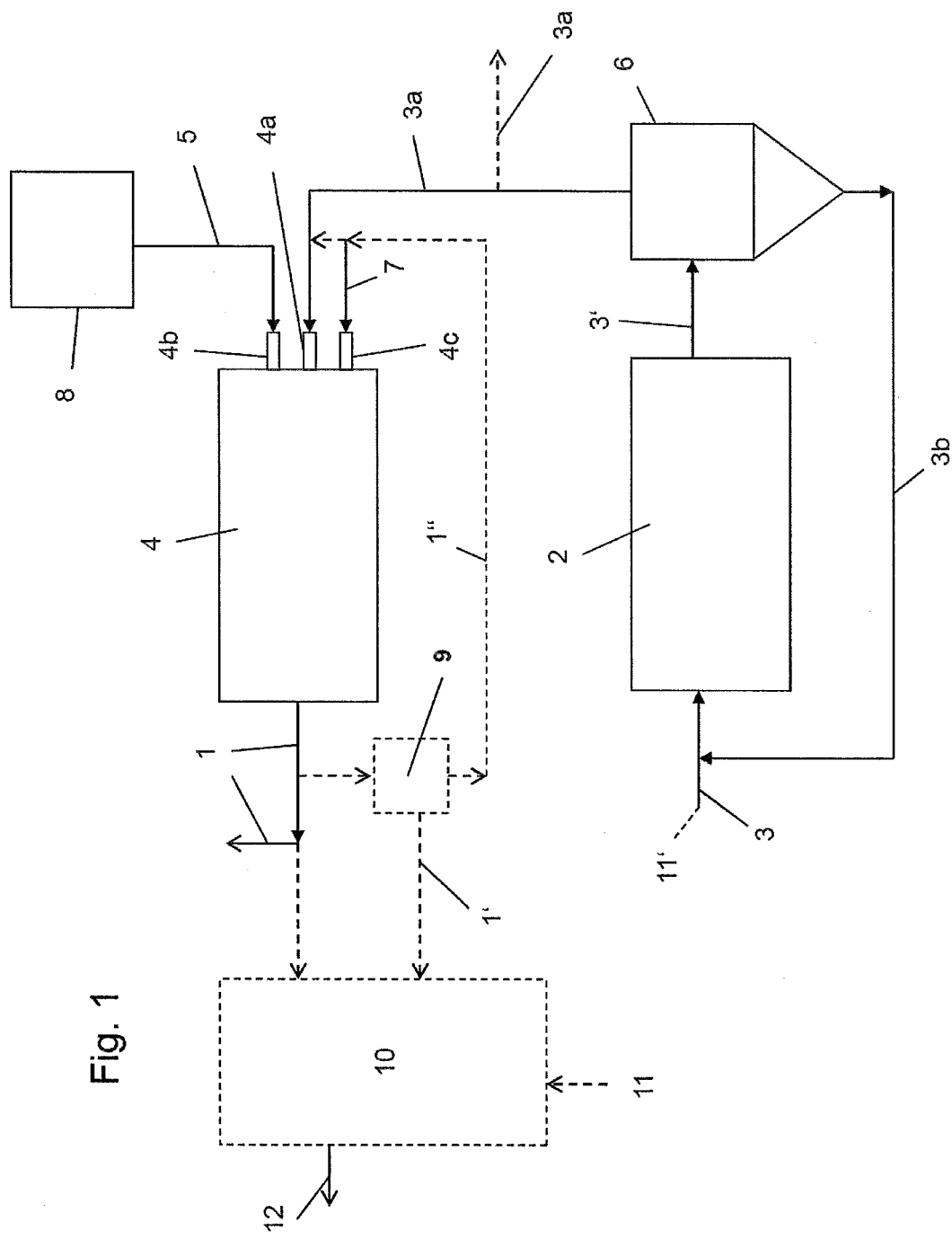
FIG. 1 is a schematic block diagram of a system for producing a hydraulic binder and/or a binder mixture.

The method of the invention for producing a hydraulic binder by processing of a silicate-containing component with calcium silicate hydrate- and/or belite-containing components is characterized by the combination of the following two method steps:

In the first method step, the silicate-containing component is comminuted in at least one comminuting facility to particle sizes of <100 µm, with at least partial breaking of Si—O—Si bonds and/or hydrogen bonds in the structure of the surface layer of the silicate-containing component, for surface activation, and In the second method step, the silicate-containing component activated in the first step is contacted as silicate-containing carrier substance with calcium silicate hydrate- and/or belite-containing components in a coating facility, with the calcium silicate hydrate- and/or belite-containing components accumulating on at least 50% of the surface area of the silicate-containing carrier substance through reactive coating.

The reactive milling described in EP 2 243 754 A1 is broken down into two separate method steps in the case of the present invention, therefore. Accordingly, in the first method step, a silicate-containing component (e.g., silica sand, slag or flyash) is comminuted to particle sizes smaller than 100 µm. In the course of this comminution, the crystalline or else amorphous structure of the silicate-containing component is broken up, producing additional, activated surfaces. The fundamental structure of the silicates is distinguished by $SiO_4$ tetrahedra, their center consisting of a silicon atom and their four corners each consisting of an oxygen atom. Essentially, all silicates are constructed by linkages of these $SiO_4$ pyramids. In the case of substances having a high silicate fraction, silicon atoms primarily attach to the oxygen atoms of the corners of the tetrahedron. These Si—O—Si bonds have a large covalent fraction, resulting in qualities including the high hardness of quartz. Besides silicon atoms, however, any other atoms may also attach at these sites.

Mechanical exposure of the silicate-containing component results in the formation of additional surfaces with numerous free valences at the silicon atoms and oxygen atoms on the surfaces. These free valences (unsaturated bonds or "dangling bonds") result in high-energy surface structures, leading in turn to high reactivity at the surfaces. As a result, subsequent reactions, such as the coating of the silicate-containing component with the calcium silicate hydrate- and/or belite-containing component, accompanied by formation of new bonds, are promoted. Competing reactions would include, for example, recombination with free water molecules. Both grinding (method step 1) and reactive coating (method step 2) are therefore usefully to take place at elevated temperatures of at least >100° C. Comminuting facilities contemplated for method step 1 include a roller mill, more particularly a roller pendulum mill, and/or a roll mill, but preferably high-energy mills such as a jet mill, an impact mill, a ball mill, more particularly a ball mill with agitator, a vibratory mill and/or a magnetic mill, and also an interconnected system and/or a combination of these types of mill.

The silicate-containing component activated in this way, as silicate-containing carrier substance, is subsequently coated in a second treatment unit with a calcium silicate hydrate- and/or belite-containing substance. This coating operation may likewise be accomplished in at least one mill, as for example in a ball mill, more particularly a ball mill with agitator, a vibratory mill, a jet mill and/or impact mill, but preferably in a roller mill, more particularly a pendulum roller mill, and/or roll mill, and also an interconnected system and/or a combination of these types of mill. Also conceivable is magnetic coating in accordance with U.S. Pat. No. 6,037,019 and use of a magnetic mill. In contrast to the first method step, coating is carried out using relatively soft grinding media, examples being plastic-clad castings or magnetic bodies. The objective of this coating or cladding is largely to avoid further comminution of the particles, and to achieve coating of the coarser silicate-containing carrier substances with the calcium silicate hydrate- and/or belite-containing components.

In the case of the reactive grinding according to EP 2 243 754 A1, where both components are milled together, there is indeed an enveloping process, but it is broken up again and again, meaning that the particles as well are comminuted again and again. This disadvantage can be avoided by separating the step of comminuting the silicate-containing carrier substance from that of coating with the calcium silicate hydrate- and/or belite-containing component, as a result of which it is also possible to reduce the fraction of the calcium silicate hydrate- and/or belite-containing component.

According to one preferred embodiment of the invention, the at least one comminuting facility is operated in the first method step together with a classifier, which separates a coarser silicate-containing component from a finer silicate-containing component, so that at least the coarser silicate-containing component is fed again to the at least one comminuting facility. Provision may also be made here for part of the finer silicate-containing component to be removed from the operation and optionally used in other ways or processed further.

In order to intensify the contact between the silicate-containing carrier substances and the calcium silicate hydrate and/or belite-containing component, it is possible for loose auxiliary bodies to be used in the coating facility. Furthermore, a further substance, preferably a fine substance, such as microsilica, can be added at up to 20% in at least one of the two method steps.

Advantageously, before the second method step, the calcium silicate hydrate- and/or belite-containing component is dewatered in at least one separate treatment facility and/or is activated at elevated temperature of preferably greater than 100° C. The coating step is advantageously accomplished likewise at temperatures of at least 100° C.

To promote coating, the coating facility envisaged for coating may have guide elements and/or stirring elements and/or loose auxiliary bodies. The material coming from the coating facility may be fed optionally to a separating facility 9. The latter separates the predominantly fully coated substances 1' from the incompletely coated substances 1", which would mean a return to the coating facility or to the removal of the finished product 1'. The finished product could be used as a binder or as an additive for a binder mixture. In an optionally downstream mixer or classifier 10, the finished product could be mixed with substances 11, such as, for example, flyash, finely ground clinker, various types of slag, Portland cement, finely ground limestone, or else the various mixtures of these substances. For such a mixing operation it would be necessary for the substances to have finenesses accordingly, to allow the end product to serve as a binder mixture.

A further variant might likewise be to supply the substances listed above, including in particular limestone as inert filler, together with the silicate-containing carrier substances, to the comminuting facility (method step 1) and to jointly comminute and/or grind them. The advantage of this is that there is no need for an additional, cost-intensive comminuting operation.

Further refinements of the invention will be elucidated in more detail below, with reference to the description and to the drawing.

The present disclosure is discussed in further detail below, with reference to the attached drawing figures.

The installation shown in FIG. 1 for producing a hydraulic binder 1 and/or a binder mixture 12 has a comminuting facility 2 for comminuting silicate-containing carrier substances 3 and/or further substances 11' to particle sizes of <100 μm, and also a downstream coating facility 4 having a first feed means 4a for the silicate-containing carrier substance 3a comminuted in the comminuting facility 2, and a second feed means 4b for a calcium silicate hydrate- and/or belite-containing component 5.

The comminuting facility 2 is operated together with a classifier 6, which separates coarser carrier substances 3b from finer carrier substances, with at least the coarser carrier substances 3b being supplied again to the comminuting facility 2, while the finer carrier substances, as activated, silicate-containing carrier substance 3a, are supplied together with the calcium silicate hydrate- and/or belite-containing component 5 to the coating facility 4. The comminuting facility 2 and the coating facility 4 may each be operated through a ball mill (with or without agitator), a vibratory mill, a magnetic mill, a (pendulum) roller mill, a roll mill, an impact mill, or a jet mill, or the like. An interconnected system and/or a combination of these types of mill is also conceivable. Where auxiliary bodies are used both in the comminuting facility 2 and in the coating facility 4, those employed in the coating facility 4 are relatively soft auxiliary bodies. By this means, further comminution of the silicate-containing carrier substances is largely avoided, and in turn intimate contact is made possible with the calcium silicate hydrate- and/or belite-containing component, in order to achieve at least 50%, preferably at least 80%, coating of the surface of the silicate-containing carrier substance. Via a third feed means 4c, the coating facility 4 can also be fed with a further substance 7, preferably a fine substance, such as microsilica, at up to 20%. Coating in the coating facility 4 takes place advantageously at a temperature of at least 100° C.

Before being fed into the coating facility 4, the calcium silicate hydrate- and/or belite-containing component 5 may be dewatered in at least one separate treatment facility 8 and/or activated at an elevated temperature of preferably 100° C. and/or subjected to a heat pressure treatment. After the coating operation, the product can be utilized as binder. In order to achieve a further reduction in $CO_2$ emissions with cements typically produced, such as OPC or blast furnace cements, for example, a mixing or classifying facility may be positioned downstream of the coating facility. In this mixing or classifying facility, hydraulic and/or latent hydraulic substances are then mixed, such as, for example, clinker, flyash, steelworks slag and/or blast furnace slag, OPC, or mixtures of these substances, producing a binder mixture with low $CO_2$ emissions. A further possibility is the admixing of inert fillers, especially finely ground limestone.

The description which follows is used to provide more detailed description of the method for producing a hydraulic binder and/or a binder mixture, where in the first method step, silica sand as silicate-containing carrier substance is activated by grinding and then is subjected to reactive coating with α-$C_2SH$ as calcium silicate hydrate component. Likewise for the first method step it is possible to add and activate other substances to the grinding operation, such as, for example, slag and/or flyash, together with silica sand.

Silica sand having a particle size fraction of 90 μm to 250 μm was used. On analysis with a laser diffraction spectrometer, the silicate-containing carrier substance, activated by treatment in a vibratory disk mill, had an average particle size of around 6 μm. In the second method step, α-$C_2$SH with an average particle size of less than 20 μm, together with the activated quartz in a mass ratio of 2:1, was subjected to reactive coating in a vibratory disk mill. Analysis with the laser diffraction spectrometer found the resulting hydraulic binder to have an average particle size of around 5 μm.

Table 1 shows the results of the quantitative x-ray diffraction analyses. In addition to 81% α-$C_2$SH, some Portlandite, and calcite, the calcium silicate hydrate component additionally contained further CSH phases (kilchoanite, foshagite), and also a calcium aluminate phase (katoite, 9%). The hydraulic binder obtained after reactive coating was found to be 60% amorphous fraction, 7% crystalline α-$C_2$SH and 33% quartz.

TABLE 1

Quantitative x-ray diffraction analysis (Rietveld determination)

| Mineral phase/sample | Calcium silicate hydrate component | Hydraulic binder |
| --- | --- | --- |
| α-$C_2$SH | 81.4 | 7.0 |
| Katoite | 9.2 | — |
| Kilchoanite | 3.2 | — |
| Foshagite | 1.6 | — |
| Portlandite | 4.2 | — |
| Calcite | 0.5 | — |
| Quartz | — | 33.3 |
| Amorphous | — | 59.7 |
| Total | 100.1 | 100.0 |

Figure 2:
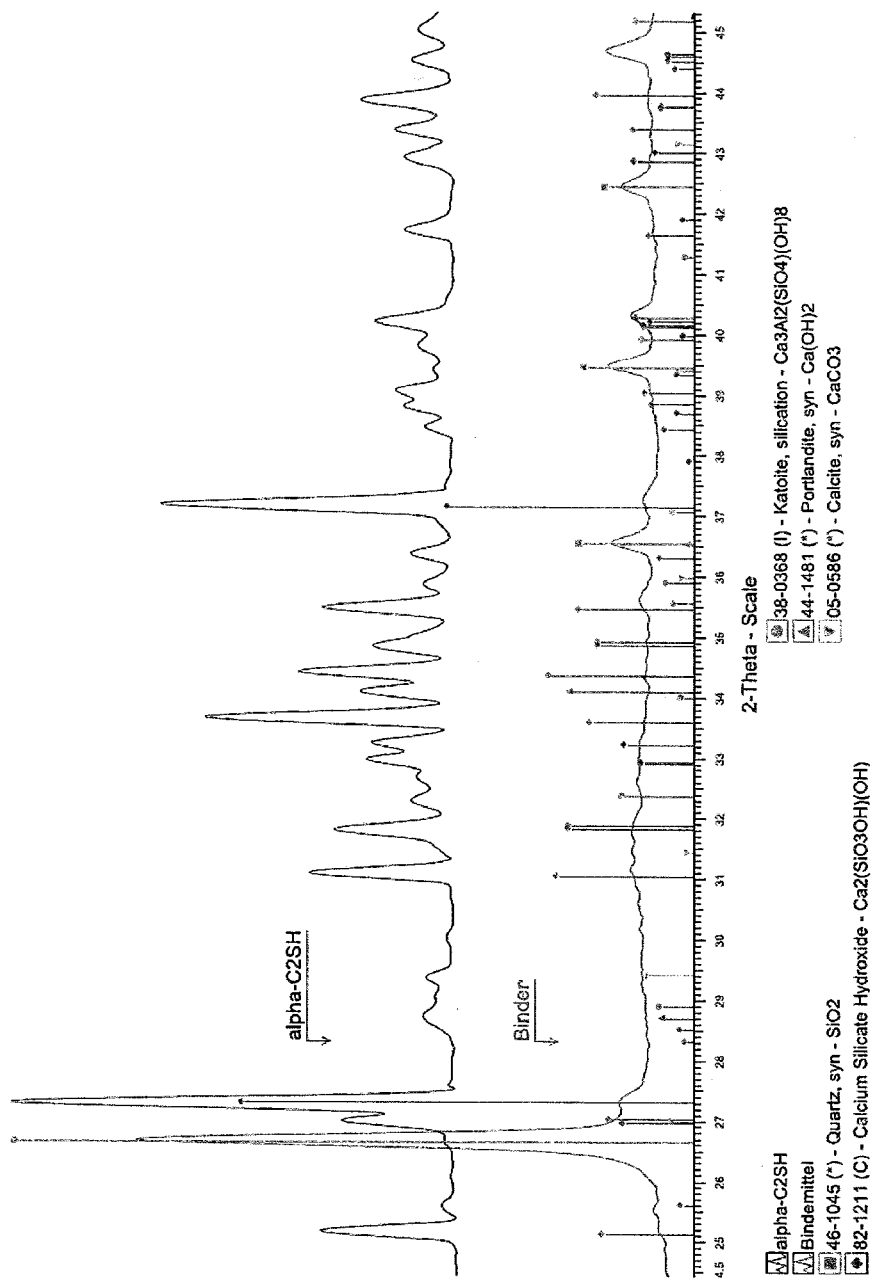
FIG. 2 is an x-ray diffractogram of the calcium silicate hydrate-containing component and of the hydraulic binder obtained.

The x-ray diffractogram of FIG. 2 shows signals of the α-$C_2$SH, which is present as the major constituent, for the calcium silicate hydrate component. After the reactive coating with activated quartz in the vibratory disk mill, there is a marked decrease in the α-$C_2$SH reflections, while at the same time the background signal increases sharply because of the formation of amorphous phases.

The invention claimed is:

1. A method of producing a hydraulic binder from the processing of a silicate-containing component with at least one of calcium silicate hydrate- or belite-containing components, the method comprising steps of:
    comminuting a silicate-containing component that is one or more of sand, slag, or flyash in at least one comminuting facility to generate a particle size of <100 μm and at least partially break one or more of Si—O—Si bonds and hydrogen bonds in a structure of a surface layer of the silicate-containing component, for surface activation; and
    contacting the surface activated silicate-containing component, as a silicate containing carrier substance, with at least one of calcium silicate hydrate- or belite-containing components in a coating facility, resulting in the at least one of calcium silicate hydrate- or belite-containing components accumulating on at least 50% of a surface area of the silicate-containing carrier substance by reactive coating.

2. The method of claim 1, further comprising:
    separating the comminuted silicate-containing component into a coarser silicate-containing component and a finer silicate-containing component by operation of a classifier; and
    feeding at least the coarser silicate-containing component back to the at least one comminuting facility.

3. The method of claim 2, further comprising:
    discharging at least part of the finer silicate-containing component from the classifier.

4. The method of claim 1, further comprising:
    intensifying contact between the silicate-containing carrier substances and the at least one calcium silicate hydrate- or belite-containing component by use of loose auxiliary bodies in the coating facility.

5. The method of claim 1, further comprising:
    adding microsilica at up to 20% by weight to one or more of the silicate-containing component in the comminuting facility or the surface activated silicate-containing component in the coating facility.

6. The method of claim 1, further comprising:
    prior to said contacting step, at least one of dewatering the at least one calcium silicate hydrate- or belite-containing component in at least one separate treatment facility, or activating the at least one calcium silicate hydrate- or belite-containing component at an elevated temperature.

7. The method of claim 1, wherein at least one of said comminuting or contacting steps is conducted at a temperature of at least 100° C.

8. A method of producing a binding mixture, comprising:
    producing a hydraulic binder according to the process of claim 1;
    applying the hydraulic binder to at least one of a mixer or classifier assembly; and
    mixing the hydraulic binder with at least one of a hydraulic substance, a latent hydraulic substance, or an inert filler.

9. A system for producing a hydraulic binder according to the method of claim 1, comprising:
    at least one comminuting facility configured to comminute a silicate-containing component to particles sizes of <100 μm; and
    at least one downstream coating facility in operative communication with said at least one comminuting facility and having,
        a first supply system in operative communication with said at least one comminuting facility and configured to convey comminuted silicate-containing component downstream from said comminuting facility to said downstream coating facility, and
        a second supply system configured to convey at least one of a calcium silicate hydrate- or belite-containing component to said downstream coating facility,
        said at least one downstream coating facility configured to contact the comminuted silicate-containing component from said comminuting facility with the at least one of calcium silicate hydrate- or belite-containing components so as to cause said at least one of calcium silicate hydrate- or belite-containing components to accumulate on at least 50% of a surface area of said silicate-containing component by reactive coating.

10. The system of claim 9, wherein said at least one comminuting facility is a roller mill, a roll mill, a high-energy mill, a jet mill, an impact mill, a ball mill, a vibratory mill, a magnetic mill, or an interconnected combination thereof.

11. The system of claim 9, wherein the at least one coating facility is at least one mill.

12. The system of claim 9, wherein the at least one coating facility is a ball mill, a vibratory mill, a jet mill, an impact mill, a roller mill, a roll mill, a magnetic mill, or an interconnected combination thereof.

13. The system of claim 9, wherein said coating facility includes at least one of a guide element, a stirring element, or loose auxiliary body configured to promote a coating of the silicate-containing component with the at least one of calcium silicate hydrate- or belite-containing components.

14. The system of claim 9, further comprising at least one of a mixing or classifying assembly disposed down stream of, and in operative communication with, said downstream coating facility.

* * * * *